United States Patent
Glitho et al.

(10) Patent No.: US 6,199,066 B1
(45) Date of Patent: Mar. 6, 2001

(54) META-SERVICE ACTIVATING INTERFACE BETWEEN A CUSTOMER ADMINISTRATIVE SYSTEM AND DATABASE NETWORK ELEMENTS OF A COMMUNICATIONS NETWORK

(75) Inventors: Roch Glitho; Christophe Gourraud, both of Montreal (CA)

(73) Assignee: Telefonaktiebolaget L M Ericsson, Stockholm (SE)

(*) Notice: Subject to any disclaimer, the term of this patent is extended or adjusted under 35 U.S.C. 154(b) by 0 days.

(21) Appl. No.: 09/119,131

(22) Filed: Jul. 20, 1998

(51) Int. Cl.[7] .................................................. G06F 17/30
(52) U.S. Cl. ................................. 707/10; 709/202
(58) Field of Search ........................ 707/10, 102, 202; 709/302, 250, 202, 226, 317, 313, 328, 329; 703/27; 395/701, 610; 379/67, 142, 115; 705/34; 370/259, 249, 385; 455/426, 428

(56) References Cited

U.S. PATENT DOCUMENTS

| | | | |
|---|---|---|---|
| 4,975,905 | * 12/1990 | Mann et al. | 370/85.1 |
| 5,012,466 | 4/1991 | Buhrke et al. | 370/270 |
| 5,517,562 | 5/1996 | McConnell | 379/207 |
| 5,537,467 | * 7/1996 | Cheng et al. | 379/211 |
| 5,541,986 | 7/1996 | Hou | 379/201 |
| 5,572,579 | * 11/1996 | Orriss et al. | 379/142 |
| 5,581,601 | * 12/1996 | Abramowski et al. | 379/67 |
| 5,608,720 | * 3/1997 | Biegel et al. | 370/249 |
| 5,629,978 | 5/1997 | Blumhardt et al. | 370/271 |
| 5,644,631 | 7/1997 | Sattar et al. | 379/201 |
| 5,650,994 | * 7/1997 | Daley | 370/259 |
| 5,696,906 | * 12/1997 | Peters et al. | 705/34 |
| 5,729,688 | * 3/1998 | Kim et al. | 709/226 |
| 5,732,127 | * 3/1998 | Hayes | 379/115 |
| 5,758,281 | * 5/1998 | Emery et al. | 455/428 |
| 5,761,500 | * 6/1998 | Gallant et al. | 395/610 |
| 5,771,275 | * 6/1998 | Brunner et al. | 370/385 |
| 5,819,092 | * 10/1998 | Ferguson et al. | 395/701 |
| 5,901,352 | * 5/1999 | St-Pierre et al. | 455/426 |
| 6,080,202 | * 6/2000 | Strickland et al. | 703/27 |

FOREIGN PATENT DOCUMENTS

| | | |
|---|---|---|
| 0 822 728 | 7/1997 | (EP) . |
| WO 97/31473 | 8/1997 | (WO) . |
| WO 99/27733 | 6/1999 | (WO) . |

OTHER PUBLICATIONS

PCT International Search Report, Oct. 28, 1999, PCT/SE 99/01173.

M. Tschichholz, et al., "Integrated Approach to Open Distributed Management", 1996 Elsevier Science B.V., pp. 76–87.

* cited by examiner

Primary Examiner—John Breene
Assistant Examiner—Linh Pham
(74) Attorney, Agent, or Firm—Jenkens & Gilchrist, P.C.

(57) ABSTRACT

A customer administrative system of a wireless communications system is interfaced with one or more system database network elements to support single command meta-service activation and management tasks. In this regard, a meta-service comprises a package of individual services. An agent is included in the interface to process single meta-service command for handling by the database network elements. The database network elements supporting the individual services implicated by the meta-service command are identified and are issued appropriately formatted, device specific commands for effectuating the meta-service activation or management task. In the event that each implicated database network element cannot successfully complete the requisite meta-service activation or management task, the service provision state of each implicated database network element is rolled-back to a service provision state prior to receipt of the meta-service command.

17 Claims, 4 Drawing Sheets

META-SERVICE ACTIVATING INTERFACE BETWEEN A CUSTOMER ADMINISTRATIVE SYSTEM AND DATABASE NETWORK ELEMENTS OF A COMMUNICATIONS NETWORK

BACKGROUND OF THE INVENTION

1. Technical Field of the Invention

The present invention relates to communications networks and, in particular, to an enhancement of the interface between a customer administrative system and database network elements of a communications network to support the activation of meta-services.

2. Description of Related Art

Reference is now made to FIG. 1 wherein there is shown a block diagram illustrating a portion of a communications network 10 implementing a prior art transaction-based interface (IF) 12 between a customer administrative system (CAS) 14 and a plurality of database network elements (NE) 16. The interface 12, customer administrative system 14, and database network elements 16 are interconnected using a network 18 preferably comprising a network, such as an X.25 network, separate and apart from the communications network 10. As an example, the communications network 10 may comprise a wireless (for example, cellular) telecommunications system, with each database network element 16 then comprising, for example, a database storing permanent and temporary wireless subscriber data (e.g., a home location register (HLR)). The permanent data stored in the database network element 16 comprises fixed information concerning the communications service subscripted to by each subscriber. The temporary data stored in the database network element 16 comprises variable information, such as in the instance of a home location register information concerning the current location of each subscriber.

The customer administrative system 14 is utilized to engage in transactions relating to the administration of the permanent data stored in each database network element 16. These administration activities, in general, relate to transactions performed for the purposes of customer (i.e., subscriber) creation or deletion, service activation, and the like, relating to a given customer. More particularly, the transactions relate to subscriber data administration tasks such as:

subscription initiation/removal/status, subscriber activation/cancellation, service provision/withdrawal/activation/passivation, C-number (transfer) definition, pass code changes, and serial number changes.

The transactions may further relate to authentication administration tasks such as authentication activation/change/deactivation/status. Additionally, the transactions relate to numbering plan configuration including number range assignment, numbering plan deletion and numbering plan viewing.

By "transaction-based" it is meant that the interface 12 receives orders originated at the customer administrative system 14 and directed (i.e., addressed) to a particular one of the database network elements 16, converts those commands to a proper format for communication to and/understanding by the addressed database network element, and routes to the addressed database network element. Similarly, the interface 12 receives any response to the order from the addressed database network element 16, converts the response to a proper format for communication to and/understanding by the customer administrative system 14 that originated the order, and routes to the originating customer administrative system. Thus, one order generated by the customer administrative system 14 which is sent through the interface 12 to an addressed database network element 16 produces one corresponding response.

In many instances, the provider of telecommunications services on the communications network 10 packages a number of individual services together for marketing and sale to subscribers as a meta-service. In order to activate and subsequently manage a meta-service, a command (such as, for example, an activation request) is originated at the customer administrative system 14 for a first one of the individual services included within the meta-service, and directed to a particular one of the database network elements 16 implicated by that individual service through the interface 12. The interface 12 functions in the manner described above to convert the command to a proper format for communication to and/understanding by the addressed database network element implicated by the individual service, and routes the command to that addressed database network element(s). This process is then repeated over and over again for each one of the individual services included within the meta-service. Thus, the customer administrative system 14 must generate, typically, at least as many commands relating to activation or management of a meta-service as there are individual services contained within that meta-service.

There is a need for an improved interface between a customer administrative system and a plurality of database network elements that will support single command activation or management of a meta-service.

SUMMARY OF THE INVENTION

An interface between a customer administrative system and one or more database network elements of a communications system includes an agent supporting single command meta-service activation and management tasks. In this regard, a meta-service comprises a package of individual services. The agent functions responsive to a received meta-service activation or management command originated by a customer administrative system to identify which one or ones of the database network elements support the individual services implicated by the meta-service command. The agent then generates individual element specific commands in a proper format for communication to and/understanding by each of those identified database network elements. The formatted specific commands are then routed to the proper database network elements for processing to effectuate the meta-service activation or management task. In instances where confirmation of successful meta-service activation or management task processing is not received, the agent issues a command to roll-back each database network element service provision state to its pre-meta-service command service provision state.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 2:
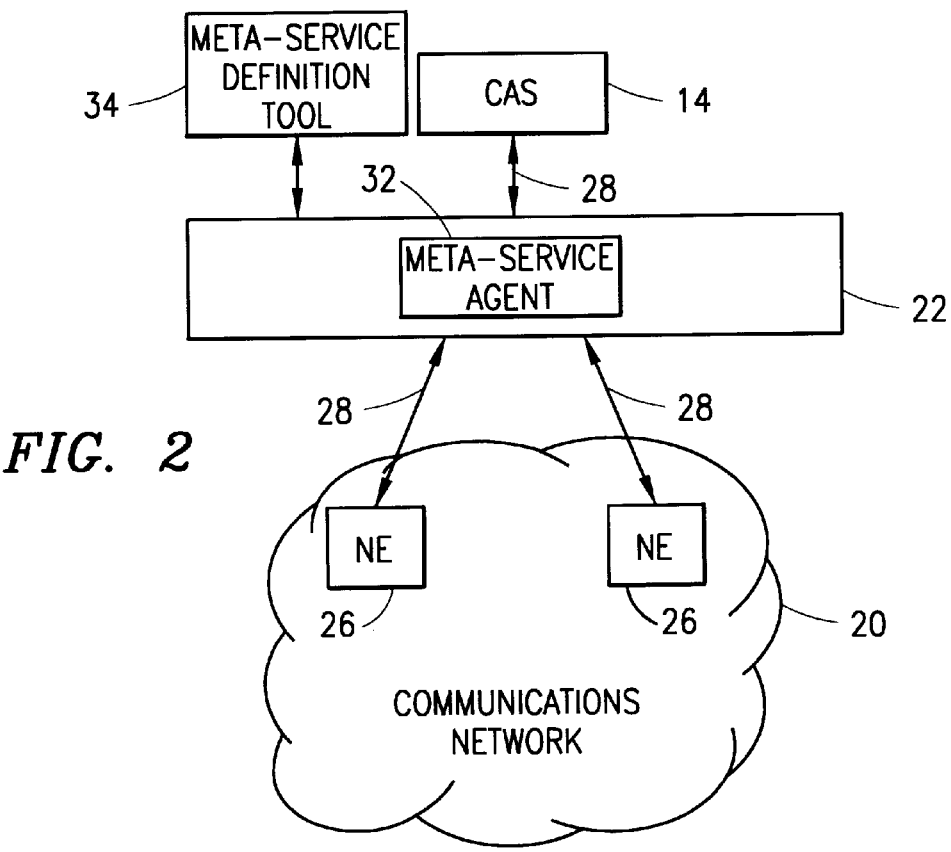
FIG. 2 is a block diagram of a portion of a communications network with a present invention interface between a customer administrative system and a plurality of database network elements supporting single command meta-service activation and management.

Reference is now made to FIG. 2 wherein there is shown a block diagram of a portion of a communications network 20 implementing a present invention interface (IF) 22 between a customer administrative system (CAS) 24 and a plurality of database network elements (NE) 26 supporting single command meta-service activation and management. The interface 22, customer administrative system 24, and database network elements 26 are interconnected using a network 28 preferably comprising a network, such as an X.25 network, separate and apart from the communications network 20. As an example, the communications network 20 may comprise a wireless (for example, cellular) communications system, with each database network element 26 then comprising a database storing permanent and temporary wireless subscriber data (e.g., a home location register (HLR)) as previously described. Thus, the database network elements 26 store permanent data comprising subscriber communications service information, and temporary data comprising the current location of each subscriber. As another example, the communications network 20 comprises an Internet-type data communications network, with each database network element 26 then comprising an Internet service node.

Figure 1:
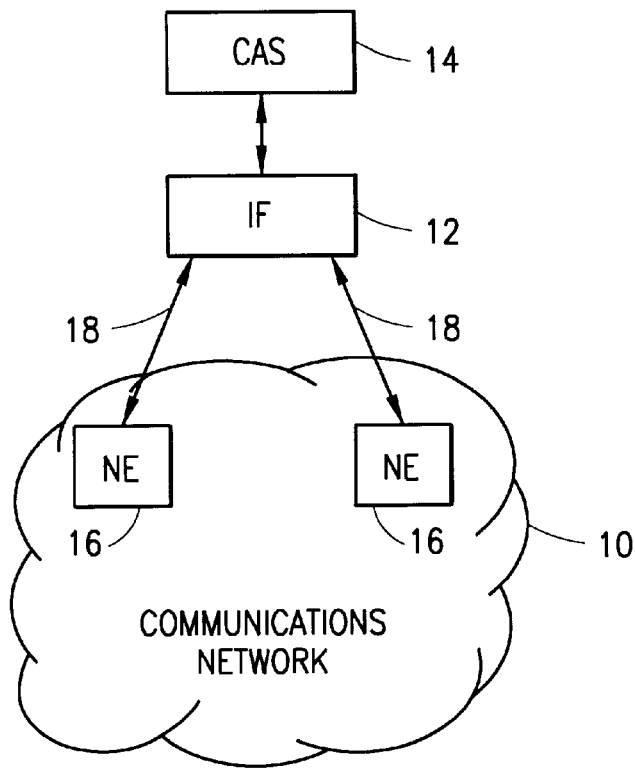
FIG. 1, previously described, is a block diagram of a portion of a communications network implementing a prior art transaction-based interface between a customer administrative system and a plurality of database network elements.

The interface 22 supports the same conventional transaction-based processing as the prior art interface 12 illustrated in FIG. 1 and previously described. These transactions involve customer administrative system 24 operation in administrating the permanent data stored in each database network element 26.

As an adjunct feature, the interface 22 further includes a meta-service activation and management agent 32. This agent 32 is charged with coordinating the activation and management of a meta-service (i.e., a packaged collection of plural individual services) in response to a single command issued by the customer administrative system 24. The agent 32, functions to (a) identify for each received meta-service related activation or management command the plural database network elements 26 that are affected by the command (i.e., the database network elements that support or are implicated in the provision of each of the individual services within the identified meta-service), (b) identify the particular activation or management action(s) to be taken by each database network element in connection with that command, (c) identify the individual element specific commands needed to effectuate those actions, (d) generate each of those individual element specific commands in a proper format (i.e., tailored) for communication to and/understanding by the identified database network elements, and (e) issue the individual element specific commands to each of those nodes. To support this operation, the agent 32 keeps track of the plural services within each meta-service, and the relationships between each of the individual services and their supporting or implicated database network elements 26. These meta-services may be designed by a user (not shown) using a meta-service definition tool 34. The definition of the meta-service and subscriber/subscription related information required for the activation may be input and changed when necessary by the user to (and for storage in) the agent 32 through the meta-service definition tool 34. The agent 32 accordingly recognizes for each individual service which of the plural database network elements 26 need to be communicated with in order to effectuate an activation or management activity relating to each meta-service. For each meta-service command, the appropriate ones of the plural database network elements 26 are identified and issued appropriately formatted individual element specific commands. The agent 32 further receives any response to the individual element specific commands from the network elements 26, converts the responses (if necessary) to a single answer in a proper format for communication to and/understanding by the customer administrative system 24 that originated the meta-service command, and routes the properly formatted answer to that originating customer administrative system.

Figure 3:
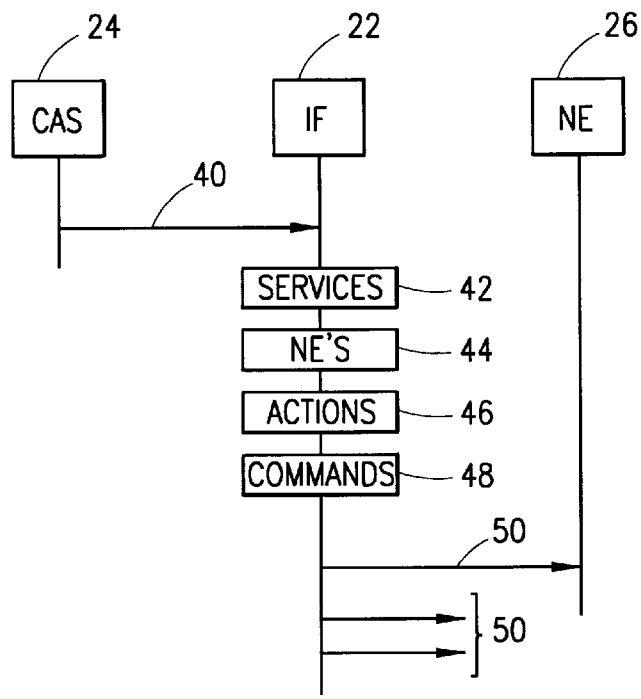
FIG. 3 is a nodal operation and signal flow diagram illustrating interface operation for handling customer administrative system meta-service activation and management commands.

Reference is now additionally made to FIG. 3 wherein there is shown a nodal operation and signal flow diagram illustrating interface 22 agent 32 operation for handling customer administrative system 24 meta-service activation and management tasks. The customer administrative system 24 sends a machine independent (i.e., generic) meta-service activation or management command 40 to the interface 22. The agent 32 processes the received command in action 42 to determine which individual services are incorporated within the command 40 identified meta-service. The agent 32 further identifies in action 44 which ones of the plurality of database network elements 26 need to be accessed in order to complete the requested meta-service activation or management activity. To support the identification processes of actions 42 and 44, the agent 32 keeps track of the plural services within each meta-service, as well as the relationships between each of the individual services and their supporting or implicated database network elements 26. Again, this information is input into the agent 32 through the meta-service definition tool 34. The agent 32 accordingly recognizes for each individual service within the meta-service which of the plural database network elements 26 need to be communicated with in order to effectuate a service related activation or management task. Following identification of these implicated database network elements 26, the interface 22 next identifies in action 46 the particular action(s) to be taken by each database network element in connection with implementing that received meta-service command 40. The actions to be taken may comprise, for example, activation or management actions to store certain data, modify certain data and/or delete certain data from each of the implicated database network elements 26. The interface 22 next identifies in action 48 the element specific commands which are needed to effectuate those actions by each of the database network elements 26. These element specific commands are formatted in accordance with a certain format and protocol associated with each individual one of the identified database network elements 26 (such as a machine dependent language). In one implementation, the original machine independent command 40 is converted into a plurality of machine dependent commands 50 tailored to the identified database network elements. The interface 22 then issues the properly formatted device specific commands 50 to each of the implicated database network elements 26.

Figure 4:
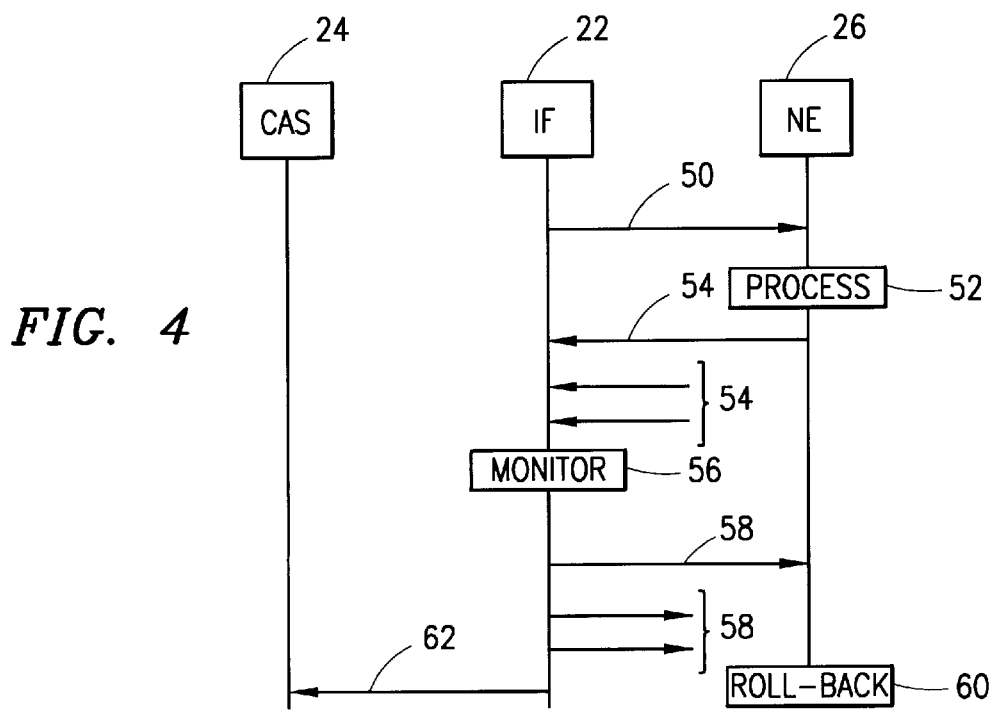
FIG. 4 is a nodal operation and signal flow diagram illustrating operation of the interface to implement automated roll-back.

Reference is now made to FIG. 4 wherein there is shown a nodal operation and signal flow diagram illustrating operation of the interface 22 agent 32 to implement automated roll-back. Once an issued, properly formatted command 50 has been received by an identified one of the database network elements 26, that element processes the command in action 52 to effectuate the required meta-service related activation or management task (such as a data store, modification or deletion concerning one of the included individual services). Once the task has been completed, the database network element 26 sends a confirmation message 54 back to the interface 22. In the meantime, the interface 22 monitors for receipt of the confirmation messages 54 in action 56 relating to each received meta-service command (40, FIG. 3) to determine whether all confirmations have been received from the identified database network elements 26. If yes, the meta-service related activation or management task has been successfully completed. If not all confirmations are received within a certain time period, it is assumed that the meta-service activation or management task was not completed in each of the identified database network elements 26. In such a situation, an unacceptable inconsistency exists between the services subscripted to by the subscriber and the services being implemented by the network. A roll-back message 58 is then generated by the interface 22 and sent to each of the database network elements 26 that responded with a confirmation message 54. In response to receipt of the roll-back message 58, the database network element 26 acts to roll-back its service provision state in action 60 to return the database network element to the service provision state it was in prior to receipt of the properly formatted device specific command 50. Responsive to the monitoring determination in action 56, a meta-service activation or management return message 62 is sent by the interface 22 informing the originating customer administrative system 24 as to whether the command 40 concerning meta-service activation or management was successfully completed.

Figure 5:
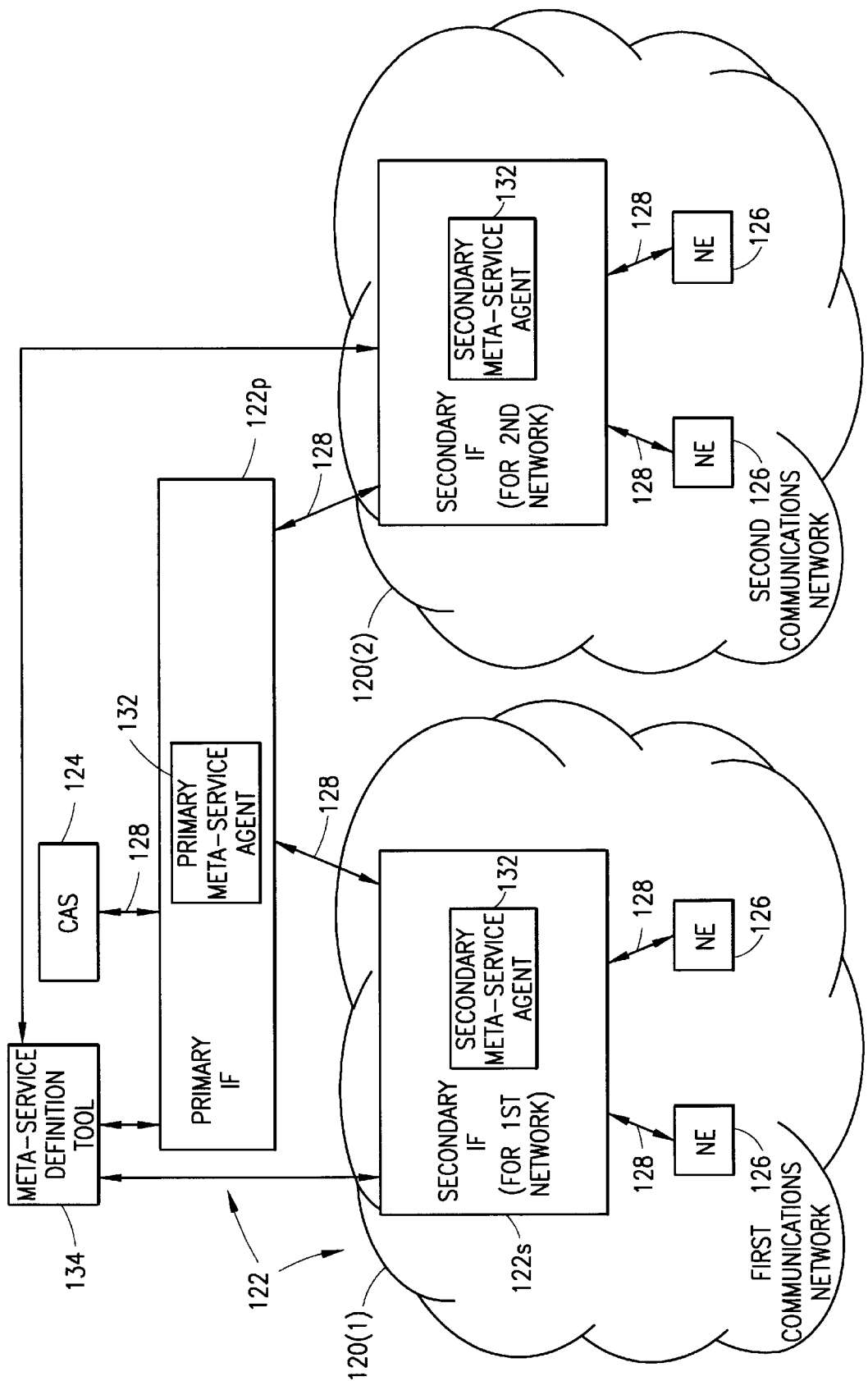
FIG. 5 is a block diagram of a plurality of a communications networks with a present invention multi-layer interface between a customer administrative system and a plurality of database network elements supporting single command meta-service activation and management.

Reference is now made to FIG. 5 wherein there is shown a block diagram of a plurality of a communications networks 120 with a present invention multi-layer interface (IF) 122 between a customer administrative system (CAS) 124 and a plurality of database network elements (NE) 126 located within the networks 120 to support single command meta-service activation and management. The multi-layer interface 122, customer administrative system 124, and database network elements 126 (within the networks 120) are interconnected using a network 128 preferably comprising a network, such as an X.25 network, separate and apart from the communications networks 120. As an example, one of the communications networks 120(1) may comprise an Internet-type data communications network, and another one of the networks 120(2) may comprise a wireless (for example, cellular) communications system. With respect to the communications network 120(1), each of the database network elements 126 comprises a service node storing data communications service subscriber data. With respect to the communications network 120(2), each of the database network elements 126 comprises a database storing permanent and temporary wireless subscriber data (e.g., a home location register (HLR)). It is, of course, understood that in some instances the functionalities performed by the network elements 125 and the secondary interface 122s layer may be contained within a single node of the network 120.

The multi-layer interface 122 supports the same conventional transaction-based processing as the prior art interface 12 illustrated in FIG. 1 and previously described. These transactions involve customer administrative system 124 operation in administrating the data stored in each database network element 126.

As an adjunct feature, the multi-layer interface 122 further includes a meta-service activation and management agent 132. This agent 132 is charged with coordinating the activation and management of a meta-service (i.e., a packaged collection of plural individual services) in response to a single command issued by the customer administrative system 124. The agent 132 functions to (a) identify for each received meta-service related activation or management command the plural database network elements 126 that are affected by the command (i.e., the database network elements that support or are implicated in the provision of each of the individual services within the meta-service), (b) identify the particular action(s) to be taken by each database network element in connection with that command, (c) identify the individual element specific commands needed to effectuate those actions, (d) generate each of those individual element specific commands in a proper format (i.e., tailored) for communication to and/understanding by the identified database network elements, and (e) issue the individual element specific commands to each of those nodes. To support this operation, the agent 132 keeps track of the plural services within each meta-service, and the relationships between each of the individual services and their supporting or implicated database network elements 126. These meta-services may be designed by a user (not shown) using a meta-service definition tool 134. The service/meta-service and subscriber/subscription related information may be input and changed when necessary by the user to (and for storage in) the agent 132 through the meta-service definition tool 134. The agent 132 accordingly recognizes for each individual service which of the plural database network elements 126 need to be communicated with in order to effectuate an activation or management task. For each meta-service command, the appropriate ones of the plural database network elements 126 are identified and issued appropriately formatted individual element specific commands. The agent 132 further receives any response to the individual element specific commands received from the network elements 126, converts their responses (if necessary) to a single answer in a proper format for communication to and/understanding by the customer administrative system 124 that originated the meta-service command, and routes the properly formatted answer to that originating customer administrative system.

With respect to this multi-layer interface 122 architecture, it is noted that a primary interface 122p layer is implemented to facilitate communications with the customer administrative system 124 concerning meta-service activation and management tasks. It is further noted that a secondary interface 122s layer is implemented within each of the plural networks 120 to facilitate communications in each of the networks 120 with the proper database network elements 126. Each interface 122p or 122s layer includes an agent 132 functionality for supporting the coordination of transactions relating to the activation and management of meta-services. It is, of course, understood that the interface 122 in a plural network 120 system may alternatively be implemented as a single layer interface 22 in the manner illustrated in FIG. 2 and previously described. In the multi-layer structure illustrated, a user (not shown) may develop meta-services and input appropriate service/meta-service related information through the meta-service definition tool 134 for storage in the agent 132 of each of the primary interface 122p layer and the secondary interface layer 122s.

Figure 6:
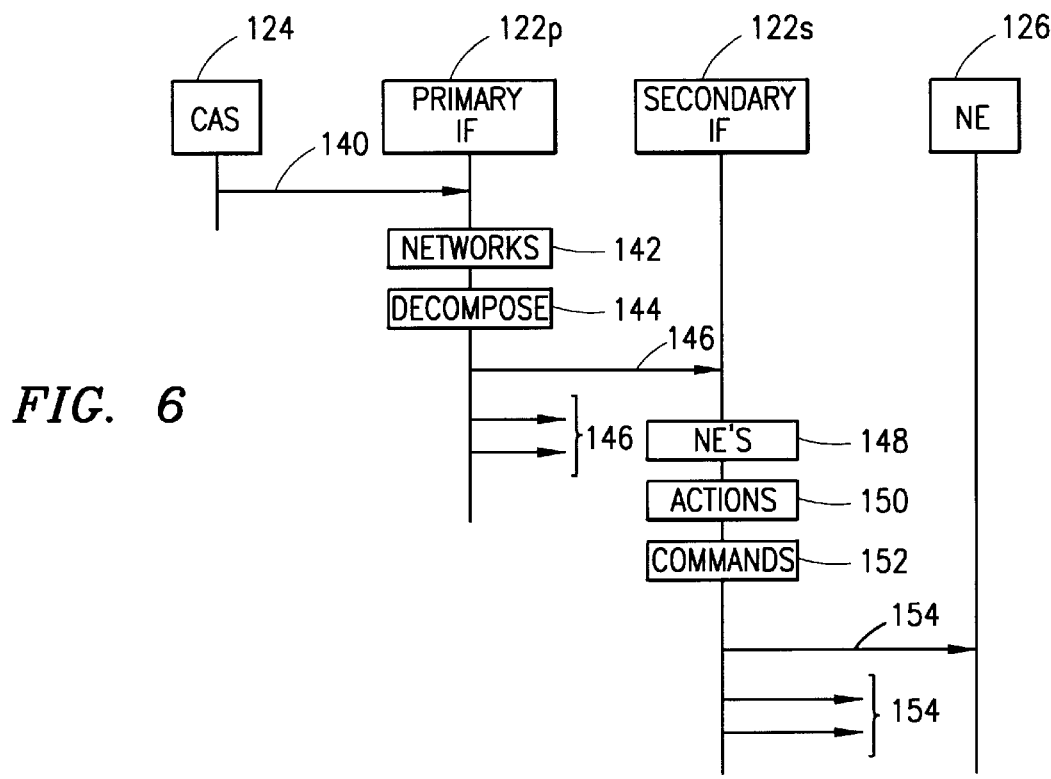
FIG. 6 is a nodal operation and signal flow diagram illustrating multi-layer interface operation for handling customer administrative system meta-service activation and management commands.

Reference is now additionally made to FIG. 6 wherein there is shown a nodal operation and signal flow diagram illustrating multi-layer interface 122 agent 132 operation for handling customer administrative system 124 meta-service activation and management tasks. The customer administrative system 124 sends a machine independent (i.e., generic) meta-service activation or management command 140 to the primary interface 122p layer. The primary agent 132 within the primary interface 122p layer processes the received command in action 142 to identify which ones of the plural networks 120 are implicated by the individual services within the identified meta-service. The received command is further decomposed in action 144 into order(s), one for each of the step 142 identified networks, relating to the services and meta-services in each network. The resulting orders are then forwarded in command 146 on to the secondary interface 122s layer within each of those identified networks 120. The secondary agent 132 within each of the secondary interface 122s layers processes the forwarded command 146 in action 148 to determine, for their own network 120, which ones of the plurality of included database network elements 126 need to be accessed in order to complete the requested meta-service activation or management activity in that network. To support the identification process of action 148, the agent 132 in each of the secondary interface 122s layers keeps track of the plural services within each meta-service, as well as the relationships between each of the individual services and their supporting or implicated database network elements 126. The secondary agent 132 accordingly recognizes for each individual service within the meta-service which of the plural database network elements 126 need to be communicated with in order to effectuate a service related activation or management activity. Following identification of these implicated database network elements 126, the secondary interface 122s layer next identifies in action 150 the particular action(s) to be taken by each database network element in connection with implementing that received meta-service command 140. The actions to be taken may comprise, for example, activation or management actions to store certain data, modify certain data and/or delete certain data from each of the implicated database network elements 126. The secondary interface 122s layer of each network 120 next identifies in action 152 the element specific commands which are needed to effectuate those actions by each of the database network elements 126 in their respective network. These element specific commands are formatted in accordance with a certain format and protocol associated with each individual one of the identified database network elements 126 (such as a machine dependent language). In one implementation, the original machine independent command 140, 146 is converted into a plurality of machine dependent commands 154 tailored to the identified database network elements. The secondary interface 122s layer in each network 120 then issues the properly formatted device specific commands 154 to each of the implicated database network elements 126.

Figure 7:
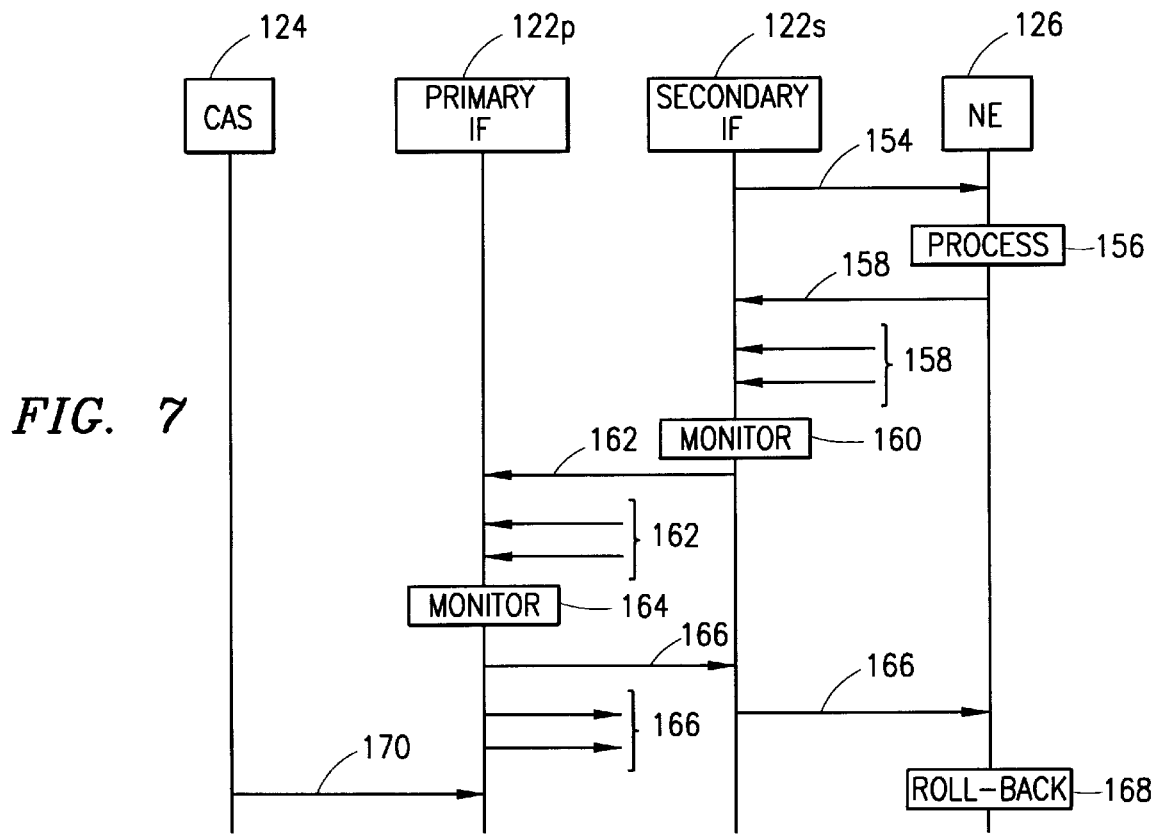
FIG. 7 is a nodal operation and signal flow diagram illustrating operation of the multi-layer interface to implement automated roll-back.

Reference is now made to FIG. 7 wherein there is shown a nodal operation and signal flow diagram illustrating operation of the interface 22 agent 32 to implement automated roll-back. Once an issued, properly formatted command 154 has been received by an identified one of the database network elements 126, that element processes the command in action 156 to effectuate the required activation or management task. Once the task has been completed, the database network element 126 sends a confirmation message 158 back to the secondary interface 122s layer. In the meantime, the secondary interface 122s layer monitors for receipt of the confirmation messages 158 in action 160 relating to each device specific command (154, FIG. 6) to determine whether all confirmations have been received from the identified database network elements 126. If yes, the meta-service related activation or management task in that particular network 120 has been successfully completed, and a confirmation message 162 is sent to the primary interface 122p layer. In the meantime, the primary interface 122p layer monitors for receipt of the confirmation messages 162 in action 164 relating to each received meta-service command (140, FIG. 6) to determine whether all confirmations have been received from the identified secondary interface 122s layers. If yes, the meta-service related activation or management task in all networks 120 has been successfully completed. If not all confirmations are received within a certain time period, it is assumed that the task was not completed in each of the identified networks 120. In such a situation, an inconsistency exists between the services subscripted to by the subscriber and the services being implemented by the networks 120. A roll-back message 166 is then generated by the primary interface 122p layer and sent to each of the secondary interface 122s layers. This roll-back message is then forwarded by the secondary interface 122s layers on to each of their database network elements 126 that responded with a confirmation message 158. In response to receipt of the roll-back message 166, the database network element 126 acts to roll-back its service provision state in action 168 to return the database network element to the service provision state it was in prior to receipt of the properly formatted device specific command 154. A meta-service activation or management return message 170 is also sent by the primary interface 122p layer informing the originating customer administrative system 24 as to whether the command 140 concerning meta-service activation or management was successfully completed.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system, comprising:
 a customer administrative system operating to issue a single processing task command concerning a meta-service;
 a plurality of database network elements of a communications system, the database network elements supporting individual services, certain ones of those individual services being packaged together to form the meta-service; and
 an interface between the customer administrative system and each of the plurality of database network elements, the interface including an agent functionality responsive to the issued meta-service processing task command for identifying the certain individual services implicated thereby, identifying the database network elements supporting those identified certain individual services, and issuing device specific commands to each of those identified database network elements, wherein the issued device specific commands specify processing actions to be taken by the identified database network elements with respect to the identified certain individual services.

2. The system as in claim 1 wherein the communications network comprises a wireless telecommunications network and the database network elements comprise home location registers of the wireless telecommunications network.

3. The system as in claim 2 wherein the communications network further comprises an Internet data communications network and the database network elements comprise Internet service nodes of the Internet data communications network.

4. The system as in claim 1 wherein the specified processing actions to be taken by the identified database network elements comprise certain individual service activation actions.

5. The system as in claim 1 wherein the specified processing actions to be taken by the identified database network elements comprise certain individual service management actions.

6. An interface between a customer administrative system and a plurality of database network elements of a communications network, the interface including an agent functioning to:
   receive a single processing task command concerning a meta-service;
   identify certain individual services implicated by the meta-service single processing task command;
   identify certain ones of the plurality of database network elements which support those identified certain individual services;
   generate implementation commands, wherein each of the generated implementation commands is specifically tailored to be understood by one of the identified certain ones of the database network elements; and
   issue the generated implementation commands to the identified certain ones of the database network elements, wherein the issued implementation commands specify processing actions to be taken by the identified certain ones of the database network elements concerning the identified certain individual services.

7. The interface as in claim 6 wherein the communications network comprises a wireless telecommunications network and the database network elements comprise home location registers of the wireless telecommunications network.

8. The interface as in claim 7 wherein the communications network further comprises an Internet data communications network and the database network elements comprise Internet service nodes of the Internet data communications network.

9. The interface as in claim 6 wherein the agent further functions to:
   receive confirmation from the database network elements concerning successful completion of the specified processing actions;
   determine whether a confirmation has been received from each of the identified certain ones of the database network elements; and
   issue a service provision roll-back command message to each database network element from which a confirmation was received if the determination is made that a confirmation has not been received from each of the identified certain ones of the database network elements.

10. The interface as in claim 6 wherein the agent function to generate further functions to generate each implementation command in a machine dependent language for the identified certain ones of the database network elements.

11. The interface as in claim 6 wherein the agent function to generate converts the meta-service single processing task command from a machine independent language into a plurality of implementation commands each having a machine dependent language for the identified certain ones of the database network elements.

12. A method for interfacing a customer administrative system and a plurality of database network elements of a communications network, the method comprising the steps of:
   receiving a single processing task command from the customer administrative system concerning a meta-service;
   identifying certain individual services implicated by the meta-service single processing task command;
   identifying certain ones of the plurality of database network elements which support those identified certain individual services;
   generating implementation commands, wherein each of the generated implementation commands is specifically tailored to be understood by one of the identified certain ones of the database network elements; and
   issuing the generated implementation commands to the identified certain ones of the database network elements, wherein the issued implementation commands specify processing actions to be taken by the identified certain ones of the database network elements concerning the identified certain individual services.

13. The method as in claim 12 wherein the communications network comprises a wireless telecommunications network and the database network elements comprise home location registers of the wireless telecommunications network.

14. The method as in claim 13 wherein the communications network further comprises an Internet data communications network and the database network elements comprise Internet service nodes of the Internet data communications network.

15. The method as in claim 12 further including the steps of:
   receiving confirmation from the database network elements concerning successful completion of the specified processing actions;
   determining whether a confirmation has been received from each of the identified certain ones of the database network elements; and
   issuing a service provision roll-back command message to each database network element from which a confirmation was received if the determination is made that a confirmation has not been received from each of the identified certain ones of the database network elements.

16. The method as in claim 12 wherein the step of generating further comprises the step of generating each implementation command in a machine dependent language for the identified certain ones of the database network elements.

17. The method as in claim 12 wherein the step of generating further comprises the step of converting the meta-service single processing task command from a machine independent language into a plurality of implementation commands each having a machine dependent language for the identified certain ones of the database network elements.

* * * * *